INVENTORS:
KARL SIGWART, HEINZ GRÖNE, EDGAR MUSCHELKNAUTZ.

3,315,806
METHOD AND APPARATUS OF SEPARATING
ENTRAINED PARTICLES FROM GASES
Karl Sigwart and Heinz Gröne, Leverkusen, and Edgar
Muschelknautz, Leverkusen, Bayerwerk, Germany, assignors to Farbenfabriken Bayer Aktiengesellschaft,
Leverkusen, Germany, a German corporation
Filed Jan. 8, 1965, Ser. No. 424,432
Claims priority, application Germany, Oct. 11, 1963,
F 40,965; Oct. 18, 1963, F 41,026
17 Claims. (Cl. 209—143)

This invention is a continuation-in-part and consolidation of co-pending applications Ser. No. 400,047, filed Sept. 29, 1964, and 402,236, filed Oct. 7, 1964, both now abandoned.

The invention relates to an improved method and apparatus for separating entrained particles from gases.

Various methods and apparatuses are known in which entrained particles of a higher specific gravity are separated from a flowing gas stream by deflecting or diverting the stream so that the higher inertial force of the patricles carries the same past and out of the gas stream. These conventional methods and apparatuses generally utilize a solid surface or guide wall in order to deflect or divert the gas stream and this has the disadvantge that particles may deposit on these walls or solid surfaces disturbing the flow and impairing the separation effectiveness. In connection with sticky or adhering patricles, clogging usually results.

One object of this invention is a novel, improved method and apparatus for separating entrained particles from gases.

A further object of this invention is a method and apparatus of separating entrained particles from gases without the above disadvantages.

Figure 1:
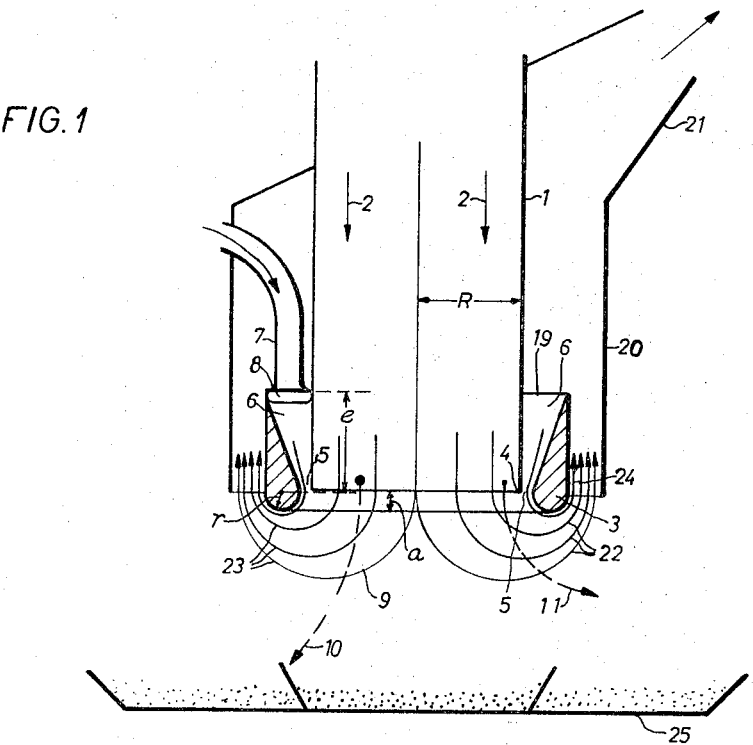
Figure 2:
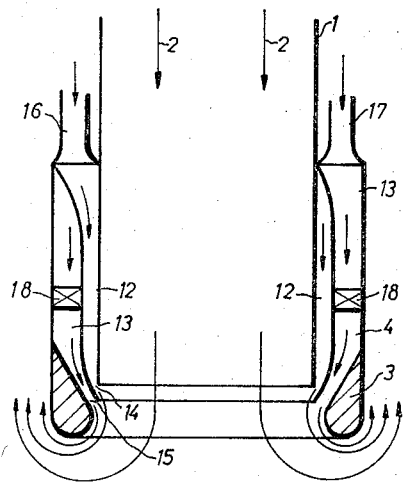
Figure 3:
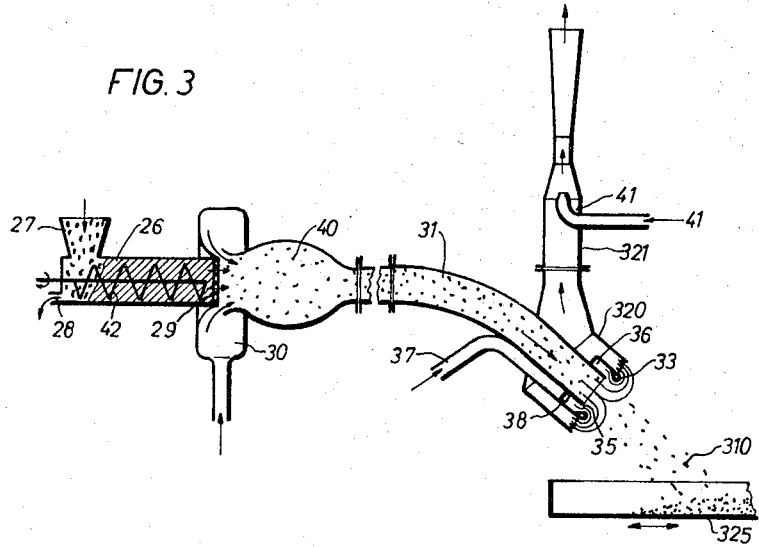

These and still further objects will become apparent from the following description read in conjunction with the drawings in which:

FIG. 1 is a diagrammatic vertical section showing an embodiment of a separator in accordance with the invention, FIG. 2 is a diagrammatic vertical section showing a further embodiment of a separator in accordance with the invention, and FIG. 3 is a diagrammatic vertical section showing an embodiment of an apparatus for drying and separating rubbery materials in accordance with the invention.

In accordance with the invention, the entrained particles of a higher specific gravity are separated from the gas by flowing a stream of the gas containing these entrained particles through a tubular passage which is preferably cylindrical in shape and which has an outlet exit which is surrounded by an annular rounded air foil so as to define an annular slot between the air foil and edge of the outlet exit. A rotating sheath of gas is passed through the annular slot around the air foil surface causing diversion of the gas stream in the direction of the sheath of gas around the air foil surface away from the particles causing separation of the particles from the gas stream. The gas stream and the separated particles may be separately recovered.

The separation is not caused by a rotation of the gas stream containing the entrained particles, and it is the auxiliary stream which is passed through the annular slot around the air foil surface which is rotated. The rotation of this auxiliary stream and its passage around the air foil surface causes a flow and pressure effect which diverts the main stream away from the inertial path of the heavier particles causing the separation without the particles moving where they would impinge on a deflecting surface.

The deflection, without rotation of the main stream, carrying the entrained particles, has the further advantage that a central axial area of reduced pressure, which could impede separation, is not formed.

The possibility does exist that the fines and ultra small particles might enter the rotating gas stream passing over the air foil surface and contact the air foil surface but this can be prevented by introducing a further thin, non-rotating layer of gas between the rotating layer and main stream.

Referring to the embodiment as shown in FIG. 1 of the drawing, 1 represents a tubular gas flow conduit which as shown is in the form of a vertical, cylindrical tube, having an outlet exit at its lower end. The tube and apparatus need, however, not be vertically positioned and may be positioned at any desired angle or horizontally. An annular, rounded air foil 3 surrounds the outlet exit of the tube 1 defining an annular slot 5 between it and the edge of the tube 1.

The rounded air foil 3 is a collar or flow guide having a cross-sectional shape of an air foil preferably with the lower or lift surface facing outwardly. This cross-sectional shape has a rounded leading edge facing in the direction of the tube 1, and is tapered rearwardly from this rounded leading edge. The radius of the rounded leading edge of this cross-sectional shape designed $r$ in FIG. 1 is preferably ¼ to ½ the radius $R$ of the tube 1 and the length $e$ extending from the radius to its narrow end, referred to herein as its tapered length, is preferably $3-5 \times r$. The smallest inner diameter of the entire annular air foil 3 should preferably be about 102 to 105% the inner diameter of the tube 1.

The leading edge of the air foil 3 should preferably extend past the edge of the tube 1 by the distance $a$, which, for example, may be 0.8 to $1.2 \times r$.

A gas supply pipe 7 leads into the space 6 between the tube 1 and air foil 3, and terminates in this space as a tangential nozzle 8.

Surrounding the tube 1 and air foil 3 is a gas collecting jacket 20 with an outlet connection 21 which is connected to a suitable suction blower or other suction device (not shown). The space 6 is separated from the interior of the collection jacket 20 by means of the top wall 19.

The size of the collection jacket 20 is preferably such that its cross-sectional area, i.e. the annular cross-sectional area between it and the air foil 3 is preferably 0.75 to 1.25, the cross-sectional area of the tube 1.

The jacket 20 is not absolutely necessary and the device may be operated without it. But in using this jacket 20 the gas stream deflected by the air foil 3 is collected and carried away. This is desirable and often necessary e.g. when the gas stream contains steam, which should not be left off freely into the surroundings, or when the gas is relatively hot.

The ratio of the cross-sections of the collection jacket 20 and of the tube as given above is selected to ensure that the deflection of the gas stream around the air foil is not disturbed.

In operation, the gas stream containing the heavier, entrained particles to be separated, is caused to flow through the tube 1, preferably without rotation, as is indicated by the flow arrows 2. Any conventional blower or pressure device may be used for this purpose. An auxiliary gas stream is passed through the supply pipe 7 and on exiting through the tangential nozzle 8 is caused to rotate in the chamber 6 passing out through the slot 5 as a rotating stream which flows through the slot 5 around the air foil 3 as is shown by the flow arrows 24, flowing up through the gas collector jacket 20, out through the outlet 21. The flow pattern causes a corresponding diversion of the main stream 2 at 9 which follows the flow path 22 and 23 up through the collecting jacket 20. The entrained particles, due to their greater inertial forces, are not diverted with the gas stream, but basically continue in their direction of movement only being slightly diverted but not reversed with the heavier particles being less diverted than the lighter particles. The separated particles are collected in a suitable collection device, such as the pan, diagrammatically shown at 25. If desired, the lighter particles may be separated from the heavier particles with, for example, the heavier particles, as represented by the path 10 being collected in the central portion of the collector, and the lighter particles as represented by the path 11 being collected in the outer peripheral portion of the collector.

The quantity of gas being passed through the slot 5 is preferably 5–20% and most preferably 10–15% of the quantity passed through the tube 1 with the axial velocity of the gas discharged through this slot being preferably about 25–50% greater than the mean velocity of the gas passing through the tube 1.

The embodiment as shown in FIG. 2 is similar to that shown in FIG. 1, except that the rotation of the auxiliary gas passed through the annular slot, designated 15 in FIG. 2, is caused by guide vanes 18, which may, for example, have the shape of a stator or vane on a gas turbine. Additionally, a separate, auxiliary passage 14 is provided for maintaining a separate sheath or layer of non-rotating gas between the layer of rotating gas and the main stream in order to prevent contact of the fines with the air foil surface.

Operation is similar to that described in connection with FIG. 1 with the main gas stream, containing the entrained particles being passed through the tube 1, the main auxiliary gas stream being passed through the supply pipe 17, and chamber 13 where the same is caused to rotate by the guide vanes 18, and passes as a rotating stream through the slot 15 following the flow path shown by the arrows.

A second auxiliary gas stream is passed through the supply pipe 16 and the chamber 12 emerging as a protective, non-rotating layer at 14, also following the path indicated by the flow arrows. The quantity of gas passing through the slot 14 may be the same as that passed through the slots 5 or 15, i.e. 5–20%, and most preferably 10–15% of the quantity passing through the tube 1 at a velocity which is about 25–50% greater than the mean velocity of the gas passed through the tube 1. The actual value of velocity of the gas passing through the tubular gas flow conduit, such as the tube 1, may vary within wide limits, and may, for example, vary between about 10 and 60 meters per second, and preferably 20 to 40 meters per second.

As the separation effect involves a purely physical phenomena, it is quite obvious that the separator, in accordance with the invention, may be used for separating any particles from any type of gaseous medium wherein the particles have a sufficiently higher specific gravity than the gaseous medium so that the same would settle out by the action of gravity from such medium if the same were in a stagnant state. The method and apparatus may also be used for classifying different weight particles of this type entrained in such a gaseous medium. The term "gas" as used herein and in the claims includes any gaseous medium, including true gases, vapors, mixtures thereof, and the like, and the particles separated and/or classified may be solid, semisolid, liquid, or the like. Examples of gases containing entrained particles which may be separated in accordance with the invention include nitrogen, carbon dioxide, hydrogen, steam and mixtures thereof. The preferred gas is air which may be moist, or even saturated or mixed with steam. These gases may have temperatures e.g. between 0 and 300° C., but these temperatures may also be lower and higher.

Particles entrained in these gases include e.g. rubber particles of all kinds, as polybutadiene, styrene-acrylonitrile rubber, polystyrene, polyisoprene. The particles may also be catalyst particles which are to be removed from reaction gases, or corn grains which are removed from an air stream which is used to carry them through a pipe. Further the particles may be the particles of a fire-extinguishing powder which is carried by a gas e.g. carbon dioxide and which may be deposited on the flames more easily and in higher concentration, as the flow of solid particles may be sharply directed.

These examples, of course, are not limiting.

The particle sizes may vary between e.g. 20 mm. and 50μ in diameter. Larger particles may be separated, if the diameter of tube 1 is wide enough, but smaller particles are sometimes deflected with the gas stream.

The separation method and apparatus in accordance with this invention has proven particularly useful in combination with the so-called "expansion process" for the drying of rubbery compositions.

In accordance with this known process, the moist, rubber material is compressed in a worm extruder, preferably with heating and then extruded through small diameter nozzles so that the extruded rubber is explosively broken up outside of the worm due to the release of pressure and sudden evaporation of the enclosed water. The extrusion was generally effected into a box or hood-like expansion chamber referred to an "an expansion box" and moist, rubber particles would generally adhere and build up on the walls of this expansion box making periodic cleaning necessary and resulting in a loss of material.

In accordance with a process described in Belgian Patent 645,007, the rubber is extruded into a small chamber in which air, which is preferably heated, is introduced and the mixture of rubber crumbs steam, and air is then conducted through a cyclone to separate the rubber crumbs from the mixture of steam and air. The amount and the temperature of the air supplied to this small expansion chamber is so adapted that the steam remains super-heated. It was not possible, however with the cyclone separator, as a practical matter, to effect complete separation and losses of the rubber particles which remained entrained in the gas occurred.

It has now been found that this disadvantage may be avoided if the separation method and apparatus in accordance with the invention is used in place of the cyclone separator.

An embodiment of the combination of the expansion process with the separation in accordance with the invention is shown in FIG. 3. The worm extruder 26 for compressing and extruding the rubber is of conventional construction having a feed hopper 27, a central rotating worm 42, a liquid outlet 28, and an extrusion or nozzle plate 29 with nozzles of a relatively small diameter. The nozzles of the nozzle plate 29 lead into the small expansion chamber 40 and an annular air nozzle 30 surrounds the nozzle plate 29 and also leads into the chamber 40. The outlet of the expansion chamber 40 is connected to a separator in accordance with the invention having the tubular gas flow conduit 31 with an outlet exit surrounded by the annular rounded air foil 33 which is so positioned as to define the annular slot 35 between it and the edge of the outlet exit of the tubular gas flow conduit 31. The slot 35 is in communication with the annular chamber 36, which is fed by the auxiliary gas supply pipe 37 terminating in the chamber 36 at the tangentially positioned nozzle 38. The gas collector jacket 320 surrounds tube 31 and chamber 36 and terminates at an outlet 321 which is connected to the jet-type vacuum pump 41 of conventional construction. A collector for the rubber, in the form of a shaker type trough 325 is positioned below the mouth of the separator.

In operation, the moist rubber material or composition is fed into the feed hopper 27 and conveyed and compressed by the worm 42 against the nozzle plate 29 with excess separated liquid running off through the outlet 28. The rubber material is forced by the worm through the small nozzles of the nozzle plate 29 into the expansion chamber 40 where the same explosively expands into the form of small particles or crumbs releasing the water as steam. Heated air is introduced through the annular nozzle 30 at a sufficiently high temperature to maintain the moisture in vapor state throughout the remainder of the apparatus, and preferably to maintain the same superheated. The velocity of the air is sufficient to carry particles through the chamber and apparatus without adhering to the walls and to impart sufficient velocity to the larger particles that the same will impinge on and loosen any smaller particles which might adhere to the walls. It has been found that velocities between about 15–40 meters per second, and preferably between about 25–35 meters per second are satisfactory for this purpose. The superheated steam-air gas stream, carrying the entrained rubber particles passes through the tubular gas flow conduit 31. Auxiliary or secondary air is passed through the supply pipe 37 into the chamber 36 through the tangential nozzle 38 so that the same rotates in this chamber and emerges through the slot 35 as a rotating air stream which flows around the air foil surface 33 into the collector jacket 320. The main stream of steam and air carrying the entrained rubber particles is also diverted in the direction around the air foil 33 as shown by the flow arrows flowing into the collector jacket 320. The entrained rubber particles maintain their direction, separate from the gas stream, and the dry particles 310 are collected in the shakertype trough 325.

The quantity of air passed through the supply pipe 37 should be between about 10–20% of the quantity of gas passing through the tubular gas flow conduit 31 and should be delivered at a pressure which is about 15–25% higher than the pressure of the air fed to the annular nozzle 30.

The jet suction pump 41 should be capable of pumping all of the gas entering the collector jacket 320 without building up a back pressure and should preferably maintain a slightly reduced pressure as for example between about 5 and 15 mm. Hg below the atmospheric pressure.

The quantity of air fed through the annular nozzle 30 should be so proportioned to the amount of rubber fed into the chamber 40 that the material is conveyed at the highest possible loading and the walls are constantly and automatically cleaned. The upper limit of the loading is determined by the separator as a certain point is reached at which the efficiency and effectiveness of the separation begins to decrease. It has generally proven expedient to convey charges of from 0.1 to 4 and preferably from 1–2 kg. of material per hour for each kg. of air per hour.

The pressure at which the system is operated is not critical, and it is possible to work normal, subatmospheric, or super-atmospheric pressures, the temperature, of course, being adjusted in relation to the pressure so that the moisture will remain in the vapor state. Since the temperature also influences the behavior of the rubber crumbs, and particularly in relation to their stickiness, it should be adjusted to the particular material at a value sufficient for the drying without causing undue or unnecessary stickiness or tackiness. Generally speaking, in drying various synthetic types of rubbers, such as polybutadiene, polyisoprene, butadiene-styrene, and butadiene-nitrile rubbers and the like, air temperatures of 30–120° C. and preferably 60–110° C. have proven satisfactory.

The process in accordance with the invention may be used for drying any "rubbery" material or rubber-like substances which could be treated by the expansion process. Such materials are generically referred to herein as rubber.

Examples of rubbers which may be treated in accordance with the invention include: emulsion polymers, such as polychloroprene, butadiene/styrene, or butadiene/acrylonitrile copolymers, block and/or solution polymers, such as polybutadiene, polyisoprene, butadiene/isoprene, butadiene/styrene, ethylene/propylene, ethylene/propylene/hexadiene, ethylene/propylene/dicyclopentadiene, butadiene/bis-cycloheptadiene, or butadiene/divinylbenzene copolymers. Blends of rubber-like products with fillers, such as carbon black, succinic acid, or metal oxides, and/or with plasticizers, such as paraffinic, naphthalenic, and aromatic oils or esters may also be dried and prepared in accordance with the invention. Polymers and copolymers of a thermoplastic nature may also be satisfactorily dried and treated in accordance with the invention. The above examples are, of course, only given by way of illustration and should in no way be considered limiting.

One particular advantage of the combination process in accordance with the invention is that the plasticity of the rubber compositions which are to be worked up can fluctuate within very wide limits. When operating with very fine rubber particles in accordance with the invention, it is possible to completely separate the same out from the gas stream and thus sufficiently effect their recovery. It is also possible to treat very fibrous types of rubber which yield larger particles or even strand-like cards when dried by the expansion process. When operating in accordance with the invention, it is unnecessary in certain circumstances to utilize a cutter device for the comminution of fibrous rubber compositions at the nozzle plate of the worm press.

The following examples are given by way of illustration and not limitation:

*Example 1*

An apparatus of the construction as shown in FIG. 1 was used. The radius of the tube 1 was 175 mm. and its length 2.5 mm. The air foil 3 had a radius $r$ 20 mm., a tapered length ($e$) of 70 mm. and was so positioned that the distance ($a$) was 20 mm. and the width of the slot 5 at its narrowest portion 4 mm. The supply pipe 7 had a diameter of 70 mm. and the nozzle area of the tangential nozzle 8 was 25 cm.$^2$. The diameter of the collector jacket 20 was 300 mm. and its edge positioned at the same level as the edge of the tube 1.

The following materials were separated under the conditions specified:

A gas consisting of a mixture of air and steam having a temperature of 150° C. and carrying cis-1,4-poly-butadiene particles having diameters between 0.1 and 10 mm.

3000 m.$^3$ of this gas, containing 250 kg. of steam was fed through the apparatus in one hour. This amount of gas carried 2.5 metric tons of cis-1,4-polybutadiene particles.

The flow speed in tube 1 was 35 m./sec. pressure was atmospheric pressure.

The speed of the auxiliary gas stream consisting of air at slot 5 was 50 m./sec. and had atmospheric pressure. The pressure at jacket 21 was 10 mm. Hg below atmospheric pressure and 3600 m.$^3$ of the gas was removed at this point in one hour.

*Example 2*

The apparatus as shown in FIG. 2 was used. All dimensions and values are identical to those given in Example 1. Additionally the flow speed in the auxiliary passage 14 was 50 m./sec.

*Example 3*

The apparatus as shown in FIG. 3 was used. The various dimensions and values are the same as in Example 1. At the inlet 30 the pressure was slightly above atmospheric pressure, i.e. about 30 mm. Hg. At the inlet 30 3000 m.$^3$ of air were introduced per hour and at the supply pipe 37 600 m.$^3$ of air per hour at a pressure of two atmospheres.

Moist polybutadiene crumbs, with a water content of about 15% are introduced into the feed hopper 27 of the worm press 23 and are conveyed by the worm 42 and compressed against the nozzle plate 29 with the water being squeezed out by this action draining off through the nozzle plate 29 is maintained at 150° C. and the pressure is maintained at about 80 atmospheres. A moist, heated rubber is forced by the worms through the nozzle of the nozzle plate into the expansion chamber 40 where the same expands. Air at a temperature of 90° C. is injected through the annular nozzle 30 at a pressure of 1.1 atmospheres so that the gas velocity in the pipe 31 is 30 meters per second and the gas stream is loaded with about 1 kg. of rubber per hour per kg. of air/steam mixture. Air is passed into the supply pipe 37 at a pressure of 1.25 atmospheres in an amount of about 15% of the quantity of the air passing through the tube 31. The dried rubber collects in the collector 325 and has a temperature of 80–85° C. The air and steam, completely free of hte rubber particles, is discharged through the collector jacket 320 passing through the exhaust 321 and the jet pump 41 which is operated to maintain a vacuum of 5–15 mm. Hg. The discharging gas steam is completely free of the rubber particles.

While the invention has been described in detail with reference to certain specific embodiments, various changes and modifications which fall within the spirit of the invention and scope of the appended claims will become apparent to the skilled artisan. The invention is, therefore, only intended to be limited by the appended claims or their equivalents wherein we have endeavored to claim all inherent novelty.

We claim:

1. A method of separating entrained particles of higher specific gravity from a gas which comprises flowing a stream of the gas containing the entrained particles through a tubular passage having an outlet exit, maintaining an annular rounded air foil surface surrounding said outlet exit to define an annular slot between it and the edge of said outlet exit, and passing a rotating sheath of gas through said annular slot around said air foil surface whereby said gas stream is diverted in the direction of said sheath of gas around said air foil surface away from the particles, and separately removing the gas and particles.

2. Method according to claim 1 which includes passing a separate non-rotating layer of gas between said stream and said rotating sheath.

3. Method according to claim 1 in which said tubular passage is a cylindrical passage and in which the gas is separately removed through a gas collection jacket surrounding said tubular passage.

4. Method according to claim 1 in which said stream of gas is a stream of gas containing rubber particles and moisture obtained from the drying of rubber by the expansion process.

5. Method according to claim 4 in which said stream of gas is a stream of air and steam containing entrained rubber particles obtained from the expansion process for the drying of rubber.

6. Method according to claim 1 which includes separately recovering different particles of differing weights.

7. A separator comprising a tubular gas flow conduit having an outlet exit, an annular rounded air foil surrounding said outlet exit defining an annular slot between it and the edge of said outlet exit, means for passing a stream of gas containing entrained particles to be separated through said gas flow conduit, and means for passing a rotating gas stream through said annular slot, said annular rounded air foil being dimensioned and positioned to cause said rotating gas stream to flow therearound.

8. A separator according to claim 7 including means for removing gas and collecting separated particles.

9. A separator according to claim 7 including a gas collector jacket surrounding said gas flow conduit.

10. A separator according to claim 7 including means defining an annular gas flow passage surrounding said gas flow conduit extending into said slot and means for passing a non-rotating gas stream through said gas flow passage.

11. A separator according to claim 7 in which said means for passing a rotating gas stream include a gas supply conduit for directing gas tangentially between said air foil and gas flow conduit.

12. A separator according to claim 7 in which said means for passing a rotating gas stream include guide vanes positioned between said air foil and gas flow conduit.

13. A separator according to claim 7 in which said rounded air foil surface has a radius of curvature of its rounded end of about 3–5× its tapered length and about ¼ to ½ the radius of said gas flow conduit.

14. A separator according to claim 7 in which said gas flow conduit is a cylindrical tube.

15. A separator according to claim 7 including means for passing rubber particles, steam, and air through said tubular gas flow conduit.

16. An apparatus for drying rubbery materials comprising in combination an expansion chamber having an inlet and outlet, means for extruding rubbery particles into the inlet end of said expansion chamber, means for passing a gas stream through said expansion chamber from said inlet end through said outlet, a gas flow conduit having an inlet and an outlet exit with said inlet flow connected to the outlet of said expansion chamber, an annular rounded air foil surrounding said outlet exit, defining an annular slot between it and the edge of said outlet exit, and means for passing a rotating gas sheath through said annular slot, said annular rounded air foil being dimensioned and positioned to cause said rotating gas stream to flow therearound, and means for separately removing gas and separated dried rubber particles.

17. Apparatus according to claim 16 in which said means for extruding rubbery particles comprises a worm press having a nozzle plate connected to the inlet of said expansion chamber.

References Cited by the Examiner

UNITED STATES PATENTS 3,035,306   5/1962   Rossiter _____ 100—37

FOREIGN PATENTS 521,697   3/1931   Germany.
774,309   5/1957   Great Britain.

FRANK W. LUTTER, *Primary Examiner.*